United States Patent [19]

Ekiss et al.

[11] Patent Number: 5,279,518
[45] Date of Patent: Jan. 18, 1994

[54] PELT PULLER APPARATUS AND METHOD

[75] Inventors: Gary L. Ekiss; William R. Wragge, both of Ellensburg, Wash.; Jerry L. Bradford, Dixon, Calif.

[73] Assignee: Transhumance DBA Superior Packing Co., Davis, Calif.

[21] Appl. No.: 5,005

[22] Filed: Jan. 15, 1993

[51] Int. Cl.$^5$ ............................................. A22B 5/16
[52] U.S. Cl. .................................... 452/128; 452/125
[58] Field of Search ........................ 452/128, 125, 160

[56] References Cited

U.S. PATENT DOCUMENTS

| | | | |
|---|---|---|---|
| 3,894,311 | 7/1975 | Johnson | 17/21 |
| 3,911,703 | 10/1975 | Repetto | 69/37 |
| 3,988,828 | 11/1976 | Geary | 30/210 |
| 4,011,630 | 3/1977 | Ochylski | 17/21 |
| 4,021,833 | 5/1977 | Schmidt, Jr. | 17/21 |
| 4,021,884 | 5/1977 | Saltykov et al. | 452/128 |
| 4,035,868 | 7/1977 | Gardner et al. | 17/21 |
| 4,099,294 | 7/1978 | Taber | 17/50 |
| 4,127,917 | 12/1978 | Pohio et al. | 17/21 |
| 4,164,056 | 8/1979 | Hilgner | 452/128 |
| 4,177,764 | 12/1979 | Geary | 119/103 |
| 4,275,481 | 6/1981 | Roberts et al. | 17/50 |
| 4,290,201 | 9/1981 | Goodwin | 30/294 |
| 4,292,931 | 10/1981 | Hopkins | 119/103 |
| 4,299,010 | 11/1981 | Robertson et al. | 17/50 |
| 4,322,873 | 4/1982 | Lunn | 452/128 |
| 4,419,821 | 12/1983 | Anderson | 30/276 |
| 4,707,885 | 11/1987 | Swilley | 17/21 |
| 4,751,768 | 6/1988 | Trujillo, Sr. | 17/50 |
| 4,980,948 | 1/1991 | Trosper et al. | 452/86 |
| 5,062,820 | 11/1991 | Rankin | 452/160 |
| 5,139,457 | 8/1992 | Rankin et al. | 452/160 |

FOREIGN PATENT DOCUMENTS

1124265 10/1956 France .................................. 452/128

*Primary Examiner*—Willis Little
*Attorney, Agent, or Firm*—Donald C. Feix

[57] ABSTRACT

A pelt puller apparatus and method utilizing hydraulic power means for stripping a pelt from an animal carcass suspended by both fore and hind legs in an upside down cradle position. The pelt puller apparatus includes a puller assembly and a kick bar assembly. The puller assembly is generally defined as an L-shaped frame structure and includes a pair of hydraulically operated clamp assemblies for holding the worked up sock portions of the animal pelt. The vertical frame portion of the L-shape framework includes a pair of telescopingly adjustable frame members and a hydraulic power means for providing vertical height adjustment of the clamp assemblies with respect to the animal carcass. The puller assembly framework is connected to an overhead rail system via a wheeled carriage assembly and includes hydraulic power means for providing fore/aft (push/pull) movement to the puller assembly. The kick bar assembly includes a kick bar member and hydraulic power means operative to move the kick bar member between a first, neutral position and a second, extended position. Movement of the kick bar member into the second, extended position provides to the animal's suspended fore legs tension which is opposed by the pull direction of the fore/aft hydraulic power such that removal of the pelt, especially in the delicate shoulder region, is facilitated without damage to carcass or damaging strain to the pelt.

10 Claims, 5 Drawing Sheets

Fig_1

Fig_2

Fig_3a

Fig_3b

Fig_4

Fig_5

PELT PULLER APPARATUS AND METHOD

BACKGROUND OF THE INVENTION

The present invention relates to animal pelting apparatus and method of use, and more particularly to a hydraulically-operated pelt pulling machine for hygienically and effectively removing the pelt from an animal carcass such that damage to the carcass exterior and grain strain to the pelt are minimized.

Various methods for removing the pelt from animals such as sheep, goats, beef stock and pigs are known in the art. Typically, these methods employ apparatus using drum rollers and chains to facilitate removal of the pelt from the carcass. Accordingly, extensive "working up" or preparatory cutting by human operators is required prior to the actual pelt stripping or pulling step. For removal of some animal pelts, and in particular sheep or lamb pelts, the animal must be worked up a sufficient amount so that the pulling apparatus does not damage the fell to ensure that the skinned carcass is left in a substantially undamaged condition. Besides being more visually pleasing to the eye, a damaged skinned carcass is worthless if deemed nonhygienic.

Therefore, in order to meet stringent hygiene requirements, great care must be exercised during working up and pelt removal to ensure that the fell is not torn and that the pelt does not contact the skinned carcass once it is pulled from the animal. Thus, it is desirable to remove an animal pelt with a minimum amount of working up performed on the animal carcass. Further, it is desirable that the pelt be removed in such a fashion so that it remains in a usable condition and does not exhibit visible signs of damage such as grain strain.

A further desirable attribute of an animal pelting apparatus is high throughput with a minimum amount of human intervention so that the pelting apparatus may be practically implemented in conventional high volume meat packing facilities.

An improved animal pelt pulling apparatus and method of use which incorporates these features and attributes and which are effective to function as described above constitutes an object of this invention.

SUMMARY OF THE INVENTION

The present invention comprises a pelt puller apparatus which utilizes a plurality of power actuator means, preferably hydraulic power means, for stripping or pulling a pelt from an animal carcass suspended by both its fore and hind legs in an upside down cradle position. The rear legs are suspended from a gambrel connected to a first overhead back rail and the fore legs are suspended from a spreader bar connected to a second, overhead forward rail.

The pelt puller apparatus comprises a puller assembly and a kick bar assembly. The puller assembly includes a framework having a pair of hydraulically actuated clamp assemblies provided to opposing spaced apart distal end portions thereof and which clamp assemblies are disposed to engage and hold the worked up sock portions removed from the animal's fore legs. A hydraulic power means for lifting and lowering the framework is provided and includes a pair of spaced-apart telescoping frame members and a hydraulic cylinder member attached to the framework. In operation, the lifting means provides positioning height adjustment of the clamp assemblies with respect to the animal carcass to better maintain a desired angle during the pelt pulling operation. The lifting means is interconnected to a pair of overhead rails by a carriage member having trolley assemblies for engaging each rail and a third hydraulic cylinder associated therewith which is operative to provide fore-aft horizontal movement of the puller assembly with respect to the carcass.

The kick bar assembly includes a kick bar member supported by an articulating frame structure and is positioned inward of the forward rail adjacent the spreader bar. The kick bar assembly is operative to engage and push the spreader bar in an outward direction away from the puller assembly to provide forward resistance or tension against the rearward pulling action of the pelt as the socks are secured in the clamp assemblies. For this purpose, a fourth hydraulic power means is provided to the articulating kick bar support structure which, when actuated, moves the spreader bar member between a first, retracted position to a second, extended (i.e., maximum tension) position.

In operation, the forward or kick motion of the kick bar assembly is preferably actuated simultaneously with the rearward or pulling motion of the overhead fore-aft hydraulic cylinder. This provides a quick snap-like action for removing the pelt from the shoulder region of the animal where the fell is most delicate. An advantage associated with the snap action feature is that less work is required in shoulder punching the pelt from the animal carcass in this area. Continued actuation of the fore-aft cylinder in the pulling mode (i.e. movement in a direction away from the animal carcass) results in the complete stripping of the pelt from the carcass. Depending on the size of the animal and the relative height difference between the suspension of the animal's fore legs to the suspension of the animal's rear legs, the vertical, up/down cylinder of the puller assembly may be operated to maintain a desired pulling angle on the pelt from the carcass during this above described pulling operation.

Once the hide is completely pulled from the carcass, the clamps are opened thereby releasing the pelt to fall into a receiving bin or fall to a conveyer for transport for offsite processing.

In a preferred embodiment, all the various hydraulic power means are interlinked to a valve manifold employing solenoid activated valves which, in turn, is electrically connected to an operator control station to permit push-button control by an operator who oversees the pelt pulling operation. In an alternate embodiment, an all mechanical system is proposed whereby conventional foot switches are used to control the hydraulic cylinder operation.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figures 1, 2:
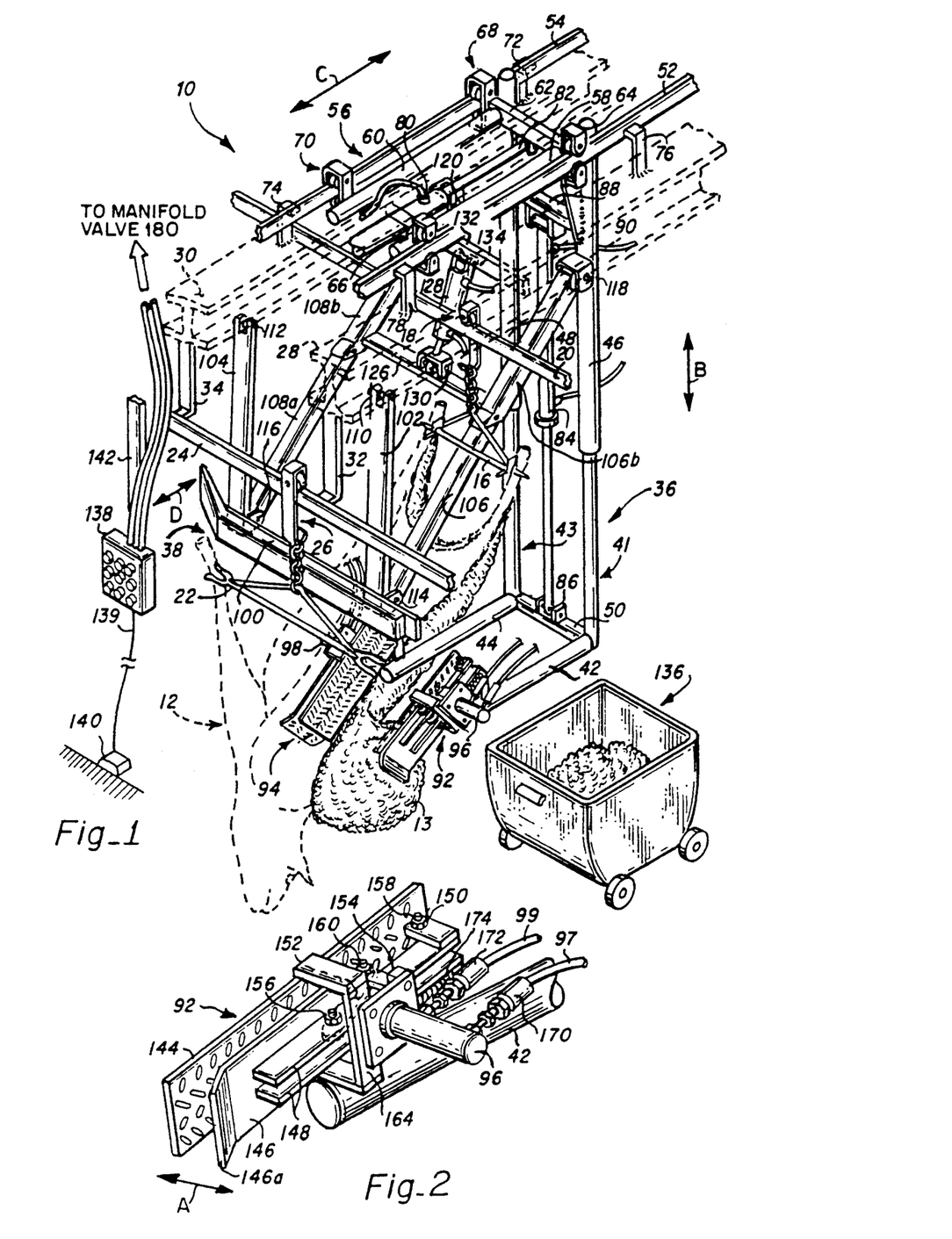
FIG. 1 is an isometric view of the hydraulically-operated pelt puller apparatus according to one embodiment of the present invention.
FIG. 2 is an enlarged isometric view of a right side hydraulic clamp assembly used for clamping a right fore leg sock portion of the animal pelt.

Referring to FIG. 1, there is shown a hydraulically-operated pelt puller apparatus constructed in accordance with a preferred embodiment of the present invention and generally designated by the reference numeral 10. In the preferred form of the present invention the type of animals to be pelted include sheep or lambs. However, as will be appreciated by those of skill in the art, the principles and teachings of the present invention are applicable for hygienic and efficient hide removal of larger stock animals including, but not limited to beef stock, goats and pigs.

The pelt puller apparatus 10 is preferably implemented as a separate station in a semi-automated meat packing facility of the kind using a chain driven overhead conveyor rail and rail engaging hook members for moving the carcass from one station to the next station on the conveyor line.

The animal 12 (shown in phantom) requires only minimal working up prior to reaching the pelt puller apparatus 10. First, the animal's hind trotters are cut off and the rear legs are suspended from a gambrel 16 in accordance with the known way. Next, a center cut down the brisket is made and working up of the fore quarter is done using a standard Y-cut to clear the brisket and a small portion of the shoulders. One advantage of the present invention is that the conventional working up requirement of extensive shoulder punching is obviated or substantially reduced in view of the "snap action" pulling feature provided by the apparatus 10 (to be described in more detail below). An analogy to this "snap action" feature can be made to pulling a bandage off of one's skin, especially a bandage over an area of skin which includes hair follicles. In order to avoid tearing a scab or damage to the skin, it is highly desirable to remove the bandage in one quick "snap" pulling action rather than by a slow peeling action. Similarly, the snap action feature of the present invention facilitates removal of the pelt from the shoulder area (i.e., where the fell is most delicate) in one quick motion so as to avoid any damage to the fell in this area.

Another feature of the present invention is the reduced amount of working up required since the need for extensive working up of the animal's fore quarter is substantially eliminated, thus minimizing the potential for dust, dirt, hair or other contaminates to contact the skin.

The gambrel 16 is connected via a rail engaging trolley and hook assembly 18 to an overhead rail or back rail 20. The back rail 20 preferably forms part of, or is directed off from the existing overhead chain rail of the meat packing facility. Prior to entering the station which comprises the pelt puller apparatus 10, the animal's fore legs are suspended from a conventional spreader bar 22 which is connected to a second overhead rail or forward rail 24 via a second rail engaging trolley and hook assembly 26 such that the animal is held in the upside down cradle position substantially as shown in FIG. 1. The forward rail 22 is preferably in the form of a single continuous loop so that after the carcass has been pelted and is caused to exit the pelt puller station, the animal's fore legs are removed from the spreader bar 22 to permit the spreader bar 22 to be advanced along the front rail 24 around the loop and into position for receiving the fore legs of the next available carcass coming down the back rail 20.

The forward rail 24 is preferably rigidly suspended from existing overhead girders 28, 30 (shown in phantom) or similar existing roof structure by connecting frame elements 32, 34, respectively. The back rail 20 may be supported in like fashion.

The pelt puller apparatus 10 principally comprises a puller assembly 36 and a kick bar assembly 38. The puller assembly 36 includes a pair of generally L-shape structures 41, 43 defined by spaced apart horizontal frameworks or frame members 42, 44 rigidly connected to telescopingly adjustable vertical frame members 46, 48, respectively. The resulting L-shape structures 41, 43 are linked by a lower transverse frame number or bar 50 at their respective L-bends. A hydraulic cylinder 84 cooperates with the telescoping members 46, 40 to provide up/down or vertical positioning for the puller assembly 36 and is pivot connected to transverse frame member 50 at its lower rod end and to intermediate transverse frame member 88 by pivot 90 at its upper end. The up/down hydraulic cylinder 84 preferably includes a double-acting piston having a 30-inch stroke to provide a desired range of vertical height adjustment to ensure that the puller assembly 36 may be maintained at a desired pulling angle with respect to the animal carcass 12.

Each vertical frame number 46, 48 is suspended at their respective upper ends from a pair of overhead rails by a carriage assembly 56. The carriage assembly 56 includes a pair of spaced apart frame members 58 and 60 which are interconnected at one end by a transverse frame number 62. The frame members 58 and 60 each support a pair of trolley assemblies 64, 66 and 68, 70, respectively, each pair of which are disposed to engaged the overhead rails 52, 54 to permit fore-aft travel of the puller assembly 36 in the direction of double arrow C. The overhead rails 52 and 54 are preferably of similar construction to the conventional track packing facility overhead conveyor system rails and are also preferably connected to existing building structure support, such as, for example, girders 28 and 30 (both shown in Phantom) by connecting members 72 and 74, 76 and 78, respectively.

The carriage 56 further includes a second hydraulic cylinder 80 having one end, in this case, the rod end, pivot connected to the upper transverse frame member 62 at 82. At its other base end the hydraulic cylinder 80 is fixed to the existing framework or structure (not shown) associated with the overhead rail system. The hydraulic cylinder 80 cooperates with the carriage assembly to provide fore/aft or horizontal movement to the puller assembly 36. In the preferred embodiment, the hydraulic (fore/aft) cylinder 80 includes a double-acting piston and has a 108 inch stroke to provide sufficient fore/aft travel for the horizontal or lateral positioning of the puller assembly 36 with respect to the carcass 12.

A pair of hydraulically operated clamp assemblies 92 and 94 are provided to the distal ends of horizontal frame members 42 and 44, respectively. The clamp assemblies 92, 94 hold the sock portions (i.e., the worked up pelt taken from the animal's fore legs) during the pelt pulling operation. To facilitate clamp closing and pelt gripping operation, each clamp assembly 92, 94 is equipped with a hydraulic power means 96 and 98 respectively. Each power means 96, 98 preferably comprising a 5 inch double acting piston. The detail of the clamp assemblies 92, 94 are discussed in greater detail below with reference to FIG. 2.

The kick bar assembly 38 includes a kick bar 100 which is suspended from the overhead girders 28 and 30 by a pair of spaced-apart articulating frame assemblies, each of which include vertical frame members 102, 104 and angled frame members 106, 108 respectively. As is best seen in FIG. 1 the vertical frame members 102, 104 are fixed to the kick bar 100 at their lower ends and pin connected at their upper ends to the overhead girders 28 and 30 at pivots 110 and 112, respectively. Pivots 110, 112 permit a degree of swinging motion to the kick bar 100 in the direction of the double arrow D. Each angled frame member 106, 108 is pivot connected at their lower ends to the kick bar 100 at pivots 114 and 116, respectively and may be pivot connected to existing overhead frame structures at their upper ends, in this case, to overhead girders 28 and 30 via pivots 118 and 120, respectively. The kick bar 100 includes an inwardly tapered guide 101 for ensuring that the spreader bar 22 is directed in front of the kick bar 100 so that tension is applied to the spreader bar 22 as the kick bar 100 is moved into its second, extended position.

In a preferred embodiment, the angled frame members 106, 108 each comprise a pair of elbow jointed arm portions 106a, 106b and 108a, 108b, respectively, each having a common intermediate elbow joint connector 106c, 108c and are bridged together by a transverse frame member 126. A fourth hydraulic cylinder 128 is provided to the kick bar assembly 38 and is pivot connected to the bridge member 26 at pivot 130 and to an upper transverse frame member 132 at pivot 134. The kick bar hydraulic cylinder 128 is preferably of the double-acting type and is operative to selectively bend and straighten the elbow joint connected frame members 106a, 106b, 108a, 108b in order to move the kick bar 100 back and forth in the direction of the double arrow D. In the fully articulated position of the assembly 38, the kick bar 100 engages the spreader bar 22 moving it outward away from the clamp assemblies 92, 94 and is preferably operated to provide tension to the animal's fore quarter region which is resisted by the pulling force of the puller assembly 36 acting on the pelt as the socks are engaged by the clamp assemblies 92, 94 and the fore/aft hydraulic cylinder 120 is operated in the rearward pulling direction. The speed of this operation is selected to be sufficiently quick to ensure the desired "snap action" for removing the pelt from the shoulder region without damage to the carcass or pelt.

Once the pelt is removed from the carcass the hydraulically operated clamp assemblies 92, 94 are opened thus releasing the pelt 13. A receiving bin 136 may be positioned underneath the pelt puller apparatus 10 for collecting pelts. Alternately, a conveyer may be placed there under for transporting the removed pelts to a different area for further processing or storage.

In the preferred embodiment, all four hydraulic cylinders 80, 84, 96 and 128 are linked to a valve manifold 180. The valve manifold 180, in turn, is preferably electrically linked to a nearby control station 138 so that the operator can manipulate the controls for the various hydraulic cylinders while overseeing the pelt pulling operation. A foot switch 140, connected to the control station 130 via line 139, may also be provided to augment operator control. As best seen in FIG. 1, the control station 138 is fixed to existing support structure (not shown) by frame member 142.

FIG. 2 is an enlarged isometric view illustrating the details of the hydraulically operated clamp assembly, in this case a right side clamp assembly 92. For purposes of this description, a right side clamp assembly refers to that clamp which is used to hold the right leg pelt portion or sock of the animal to be depelted. The following description for the right side clamp assembly 92 applies equally to the left side clamp assembly 94 as each assembly is constructed in a mirror image fashion to one another. Accordingly, for purposes of brevity, only the right clamp assembly will be discussed in detail.

The clamp assembly 92 generally defines a parallelogram linkage and includes an inner clamp member (base link) 144 and a spaced, parallel and pivotally linked outer clamp member (end link) 146. The outer clamp member 146 has an outward flared portion 146 at its sock receiving end to facilitate the insertion of the sock portion of the animal pelt when the clamp is in the open position (as shown). Outer clamp member (end link) 146 includes an integral support member 148 formed on an outward facing surface thereof and which is joined by parallel linkages 150 and 152 to the inner clamp member (or base link) 144 via pivot pin connections 154, 156 and 158, 160 respectively. A frame member 164 is provided to the inner clamp member 144 and supports the connection for the hydraulic cylinder 96.

In operation pressurized fluid through hydraulic lines 97 and 99 alternately retracts or extends the inner rod member (not shown) of the hydraulic cylinder 96 which, in turn, moves the outer clamp member 146 into the open or closed position as shown by directional arrow A. To regulate fluid pressure and flow rates to the hydraulic cylinder 96, flow compensator valves 170 and 172 may be provided in the hydraulic line connectors in accordance with the known way. The other cylinders 80, 84 and 108 are also preferably provided with appropriate flow control devices to ensure a desired operational speed. The outer clamp member 146 is biased to the open position by tension spring 174 upon a reversal of fluid pressure through hydraulic lines 97, 99.

Figure 3A:
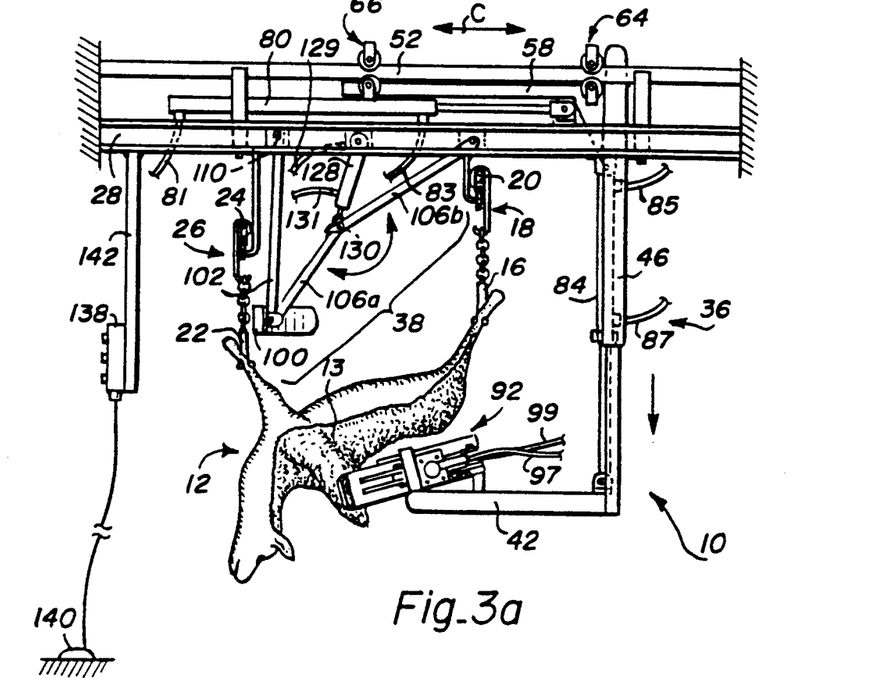
FIGS. 3a-3d are a series of side elevation views of the pelt puller apparatus of FIG. 1 illustrating the pelt pulling operation on an animal (animal is shown in the cradle position) and the range of machine movement afforded by the various hydraulic actuators.

Referring now to the series of FIGS. 3A-3D, the operation of the pelt puller apparatus 10 of the present invention will be described. FIG. 3A shows the animal positioned within the pelt puller apparatus 10 and suspended in the upside down cradle position. The right and left sock portions of the pelt 13 are placed within the respective open clamp assemblies 92, and 94 (94 not shown). The clamp assemblies are then actuated to close and grip the socks. During the initial pull action, the vertical height of the clamp assemblies 92, 94 is preferably even with the animal's shoulder region. Height adjustment is made by selectively pressurizing hydraulic lines 85 and 87 of the up/down hydraulic cylinder 84. Fore/aft positioning of the clamp assemblies 92, 94 is performed by selective pressurization of hydraulic lines 81 and 83 of the fore/aft hydraulic cylinder 80. All fine tune adjustment to the hydraulic cylinders may be made at the control station 138 and/or via the foot pedal 140.

Figure 3B:
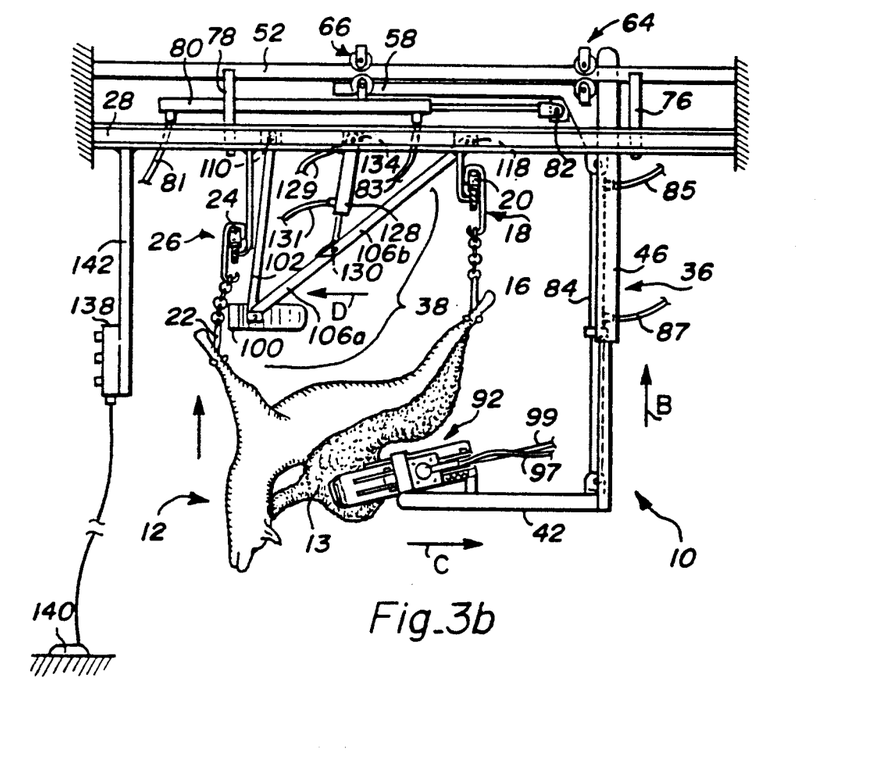
Figure 3C:
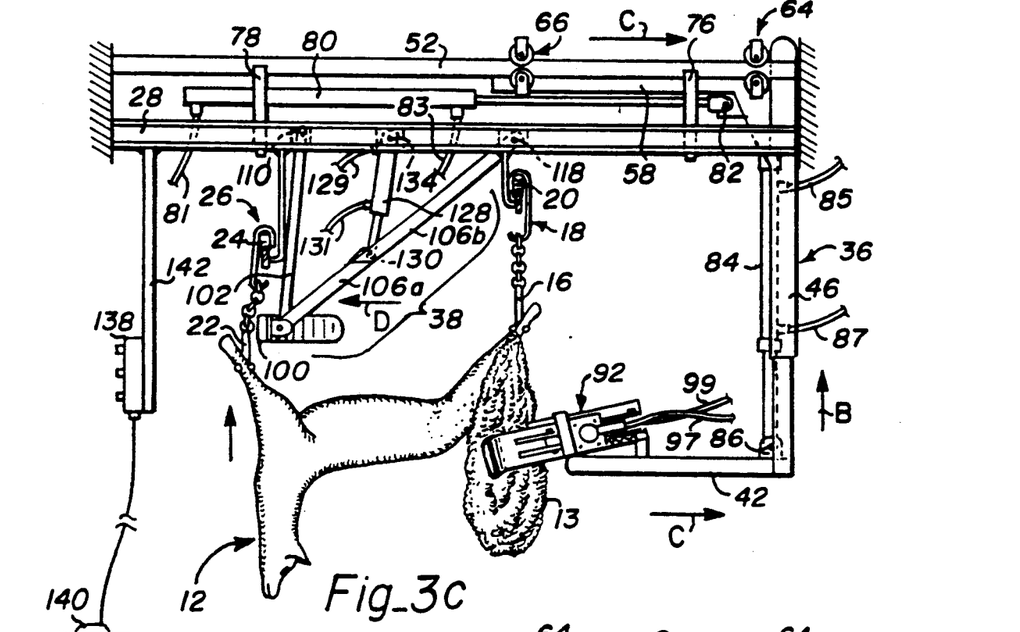

Note, as is best seen in FIGS. 3A-3B, there is preferably a slight height differential between the suspended hind legs supported on gambrel 16 relative to the suspended fore legs supported by spreader bar 22. As the kick bar 100 is caused to move against the spreader bar 22 by appropriate pressurization of lines 129 and 131 of kick bar cylinder 128, the spreader bar 22 is moved upwardly and outwardly to provide adequate tension on the pelt 13 as it is being pulled from the animal 12. The kick bar hydraulic cylinder 128 and fore/aft hydraulic cylinder 80 are preferably operated simultaneously, thus resulting in the quick snap separation of the pelt 13 in the area of the shoulder region of the animal 12.

As is best seen with reference to FIG. 3, depending on the size of the animal, the telescoping vertical frame members 46, 48 (48 not shown) may be adjusted by actuation of the up/down cylinder 84. This adjustment enables the pelt 13 to be pulled from the carcass 12 at a desired angle. In practice, the clamp assemblies 92, 94 are positioned at a height substantially even with or just slightly above the height of the animal's shoulder and may be raised upward during the pulling operation to remain substantially horizontally even with the point of separation of the animal's pelt from the carcass.

Alternately, the spreader bar 22 may be initially suspended at a higher elevation so that it is substantially even with the height of gambrel 16. In this way, the animal is held in a more even cradle position and elevation of the puller assembly 36 via actuation of the up/down cylinder 84 may be unnecessary during pulling operation. Note that for such an alternate embodiment it is desirable to alter the geometry of the articulating kick bar assembly 38 such that it moves the spreader bar 22 outward a greater distance in the direction of arrow D (FIGS. 3b, 3c) sufficient to provide the desired "snap" tension upon the extension operation of cylinder 128.

Figure 3D:
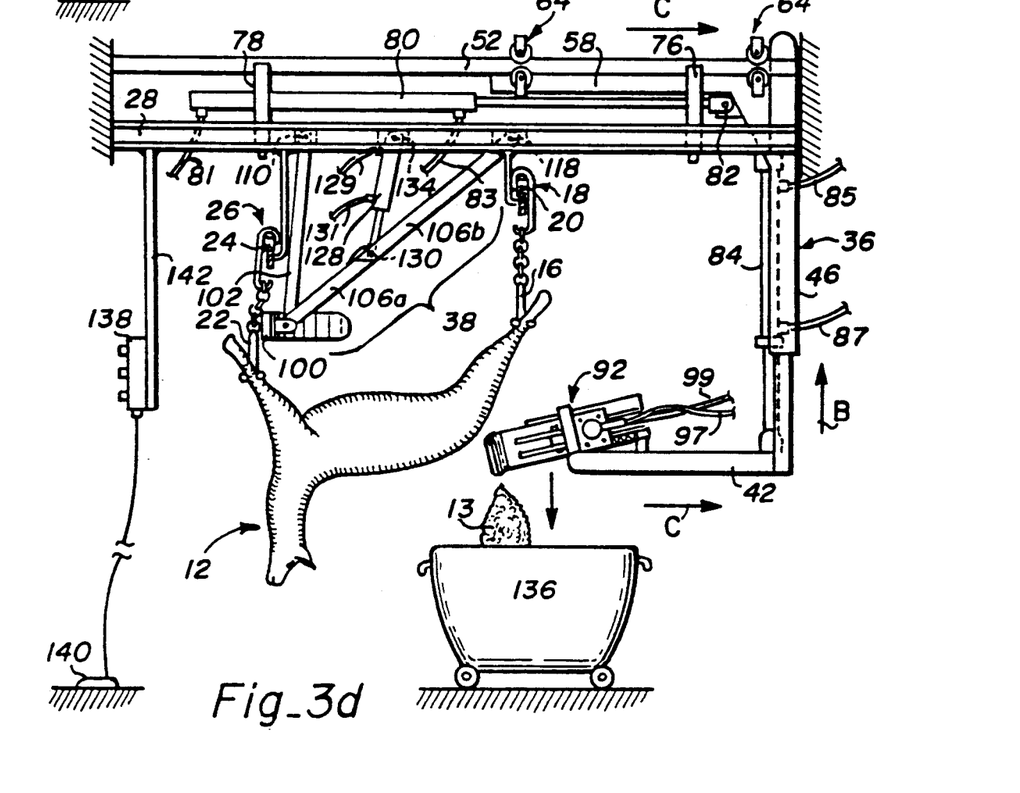

Once the pelt 13 is separated from carcass 12, the clamps assemblies 92, 94 are opened, thus releasing the pelts 13 to fall into receiving bin 136. This is best seen in FIG. 3D. The skinned carcass 12 is then transported down the line after which the fore legs are removed from the spreader bar 22. The spreader bar 22 is then recirculated back to a starting position to receive the next available carcass.

Figure 4:
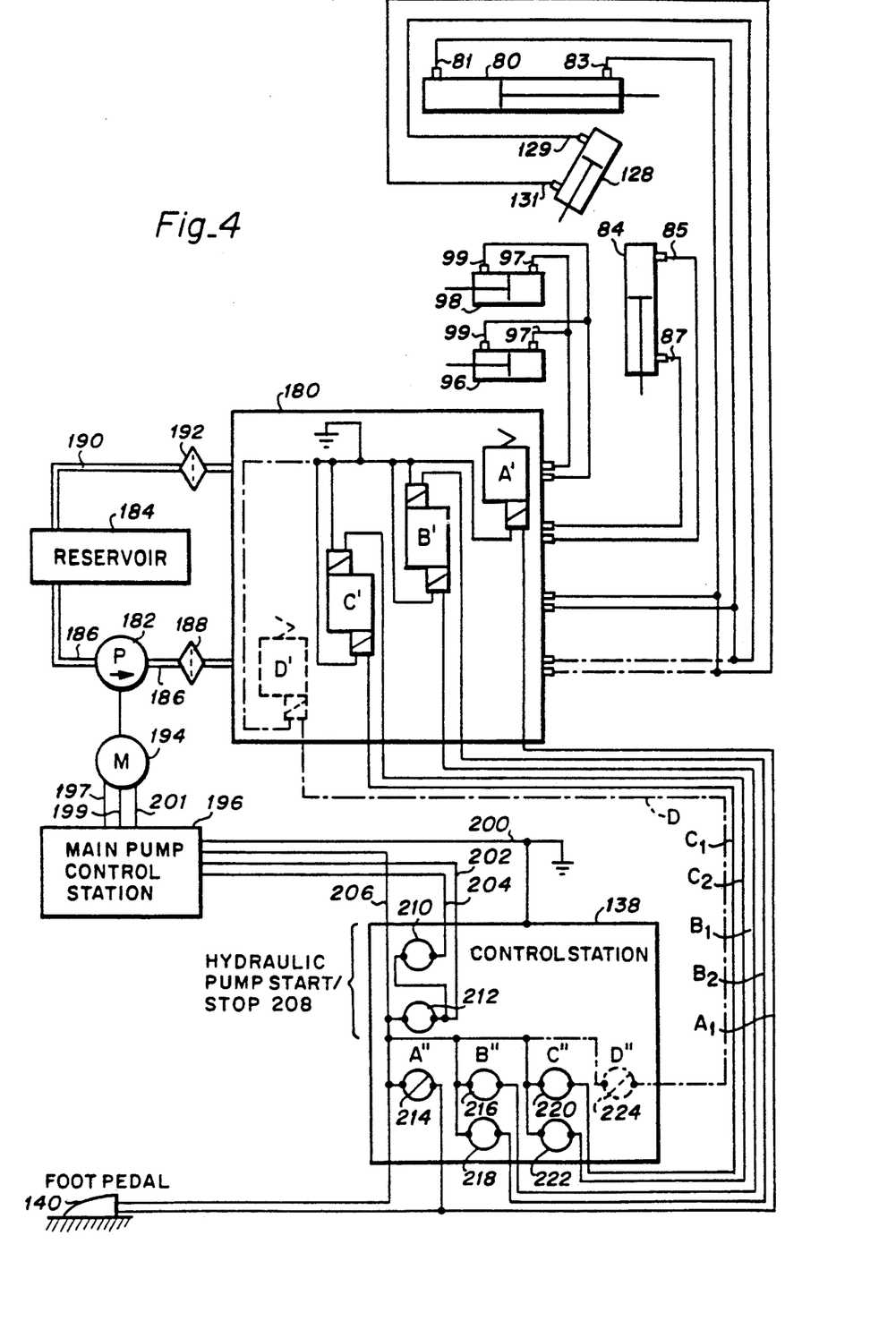
FIG. 4 is a schematic diagram of the hydraulic and electric circuitry of a preferred embodiment of the invention.

FIG. 4 illustrates schematically the hydraulic connection of the various components and its relationship to the electrical system of the present invention. Each hydraulic cylinder 80, 84, 96, 98 and 128 is connected to valve manifold 180 as shown. Valve manifold 180 is preferably a conventional parallel circuit aluminum hydraulic valve manifold.

In the preferred embodiment, the valve manifold 180 includes three individual solenoid operated valves A'-C'. Valve A' is preferably a single solenoid active, spring-return valve for controlling the linked hydraulic lines 97 and 99 of the hydraulic cylinders 96 and 98 which comprise the right and left clamp assemblies 92 and 94, respectively. Valve B' is preferably a dual solenoid, double-acting piston, closed-center valve which controls the operation of up/down hydraulic cylinder 84 via selective pressurization of hydraulic lines 85 and 87. Valve C' is preferably also a dual solenoid, double-acting piston, closed-center valve and is used to simultaneously control both the push/pull action provided by the fore/aft hydraulic cylinder 80 via selective pressurization of lines 81 and 83, and the extension/retraction action of the kick bar hydraulic cylinder 128 via selective pressurization of hydraulic lines 129 and 131. In an alternate embodiment, the kick bar hydraulic cylinder 128 may be independently controlled by a separate single solenoid active, spring-return valve D' (indicated in phantom).

Also included is pump 182 for drawing fluid from a reservoir 184 via a discharge line 186 which feeds to the valve manifold 180. The discharge line 186 may also include a high pressure filter 188. A high pressure return line 190, preferably including a further high pressure filter 192, directs fluid from the manifold 180 to the reservoir 184. A motor 194 is used to drive the pump 182. In the preferred embodiment, the motor 194 is rated at 25 hp and the fluid pressure in the lines ranges from about 1000 to 1300 PSI.

The electrical system comprises the control station 138 and a main pump control station 196. The motor 194 is electrically connected to the main pump control station 196 by standard electrical connectors indicated as lines 197, 199 and 201. The electrical connection from the main pump control 196 to the control station 138 include a common ground wire 200 and power lines 202, 204 and 206 which are connected to a three-position switch 208 which controls a hydraulic pump start/stop operation.

The position of switch 208 is selected by actuation of either start button 210, stop button 212 or foot pedal 140. Line 206 is also linked to toggle switch 214 (also indicated at column A") which controls the clamp assembly operation via solenoid valve A' of the manifold 180. Electrical signals corresponding to the up/down hydraulic cylinder operation and the fore/aft hydraulic cylinder operation are sent along lines B1, B2 and C1, C2, respectively, to control the dual solenoid valves B' (up/down) and C' (fore/aft) by selective actuation of the appropriate up/down buttons 216, 218 (indicated at column B") and fore/aft buttons 220, 222 (indicated at column C"). Each group of buttons (B" and C") includes a three position switch similar to switch 208. As discussed above, the control for the kick bar hydraulic cylinder 128 may be linked to the control for the fore/aft hydraulic cylinder 180 for simultaneous operation. Accordingly, activation of fore-aft buttons 220 and 222 would also extend or retract the kick bar hydraulic cylinder 128. Alternately, a separate toggle switch 124 associated with valve D' may be independently linked between the control station and the valve manifold 180 to provide independent operation of the kicker bar cylinder 128.

As will be appreciated by those with skill in the art, known programmable logic controller (PLC) devices may be implemented in place of, or in combination with, the above described electrical system to control the operation of the hydraulic cylinders.

Figure 5:
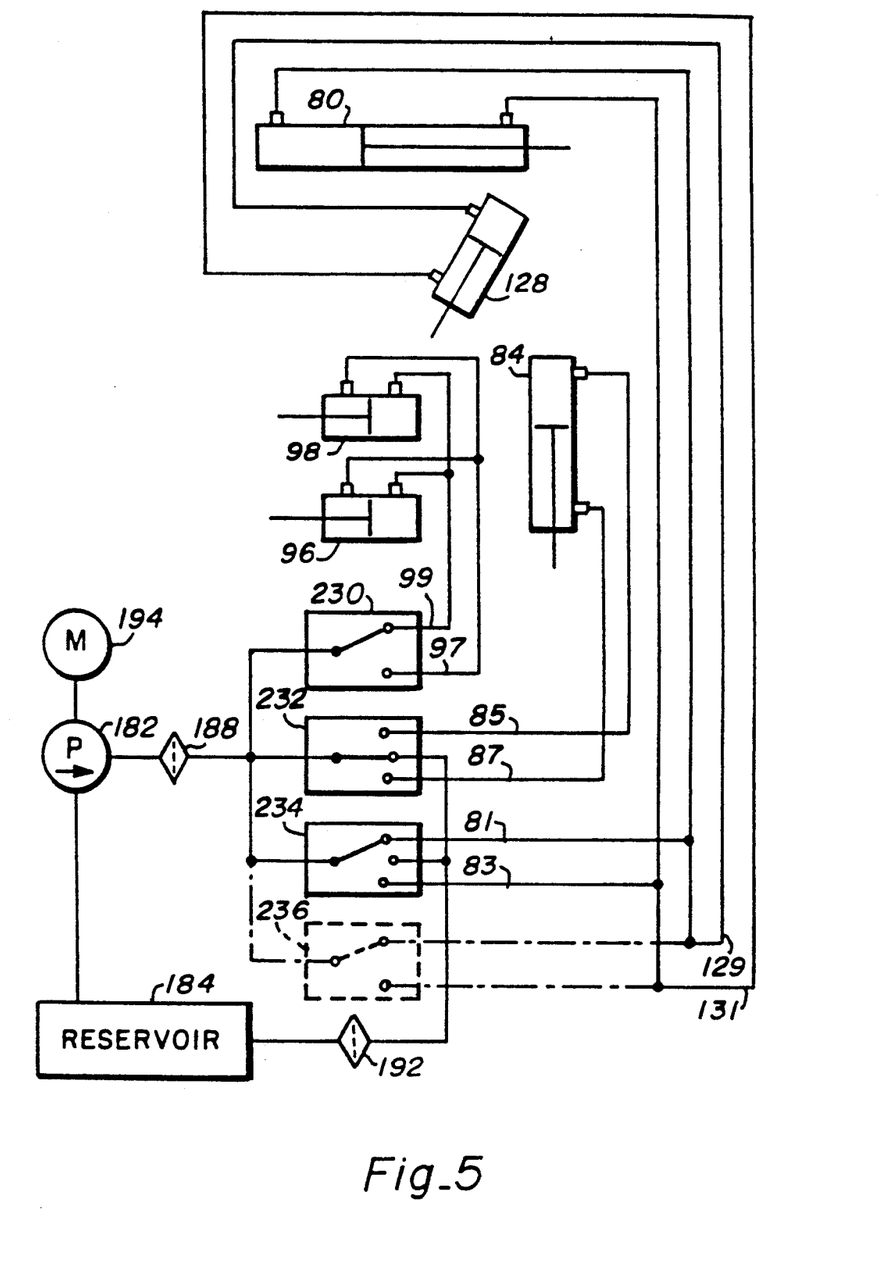
FIG. 5 is a schematic diagram of the hydraulic circuitry of a second, all mechanical embodiment of the invention.

FIG. 5 shows an alternate embodiment for the hydraulic circuitry of the present invention wherein an all mechanical system is shown. In this embodiment, the valve manifold 180 is replaced by three manually operated foot pedals 230, 232 and 234. Foot pedal 230 is preferably a two position on/off switch while foot pedals 232 and 233 are three-position switches wherein the middle position corresponds to the neutral operation of the fore/aft and up/down hydraulic cylinders. As before, an optional fourth two-position foot pedal 236 may be included for independent control of the kicker bar cylinder 128.

It should be understood that various modifications within the scope of this invention can be made by one of ordinary skill in the art without departing from the spirit thereof. For example, while all of the above described embodiments of the invention utilize hydraulic actuators to perform the various positioning and adjustment functions of the pelt puller apparatus 1, it is understood that other known power positioning means may be effectively used, including but not limited to, pneumatic rams and linear actuators. We therefore wish our invention to be defined by the scope of the appended claims as broadly as the prior art will permit, and in view of the specification if need be.

We claim:

1. An improved animal pelt puller apparatus for removing a pelt from an animal carcass suspended by both fore and hind legs in an upside down cradle position, said pelt puller apparatus comprising in operative combination:
   a) a puller assembly which includes:
      i) a pair of spaced clamp assemblies for gripping left and right side worked up sock portions removed from left and right fore legs of said pelt;
      ii) a framework having a pair of spaced apart horizontal members, each horizontal member for supporting one of said clamp assemblies at distal ends thereof;
   b) a first power means for lifting and lowering said framework to permit vertical height positioning of said clamp assemblies with respect to said animal carcass;
   c) a second power means for fore/aft positioning of said framework along an axis spaced from and parallel to a long axis of said animal carcass to permit horizontal movement of said clamp assemblies from a first, forward position substantially aligned with a fore quarter region of said animal carcass to a second, rearward position adjacent a hind quarter region of said animal;
   d) a kick bar assembly disposed adjacent the suspended fore legs of said animal carcass, said kick bar assembly including a kick bar member and a third powers means operative to move said kick bar member between a first retracted neutral position and a second, extended work position such that movement of said kick bar to said second, extended work position moves the animal's fore legs in a direction opposite to the aft movement of said second power means to provide a desired tension to the animal's pelt during pulling operation; and
   e) control means for selectively operating said first, second and third power means to provide an initial snap pull on the pelt and to maintain a desired pulling angle of said clamp assemblies with respect to said animal carcass so that damage to the fell and grain strain of the pelt is substantially eliminated.

2. An animal pelt puller as in claim 1 wherein:
   a) said first up/down power means comprises a pair of spaced telescoping members, and a vertically oriented hydraulic cylinder connected to said framework and disposed to move said clamp assemblies vertically up or down as desired to follow a bottom curvature of said animal carcass as said clamp assemblies are moved in a fore/aft direction by said second power means.

3. An animal pelt puller as in claim 2 wherein said second fore/aft power means comprises:
   a) a wheeled carriage assembly disposed connecting said first up/down power means to an overhead rail system to permit fore/aft travel to said puller assembly; and
   b) a horizontally oriented hydraulic cylinder associated with said carriage assembly disposed to move said puller assembly between said first, forward position and said second, rearward position.

4. An animal pelt puller as in claim 3 wherein each of said clamp assemblies include power means connected to said control means for pelt gripping and pelt releasing operation.

5. An animal pelt puller as in claim 4 wherein said third kick bar assembly power means comprises a hydraulic cylinder.

6. An animal pelt puller as in claim 5 wherein said clamp assembly power means comprises a hydraulic cylinder.

7. An animal pelt puller as in claim 6 wherein said control means comprises:
   a) a hydraulic valve manifold having a plurality of solenoid actuated valves, each valve associated with one of said clamp assembly power means, said first up/down power means, said second fore/aft power means and said third kick bar assembly power means; and
   b) an operator control station disposed electrically connected to said hydraulic valve manifold.

8. An animal pelt puller as in claim 6 wherein said control means comprises a plurality of manually operated hydraulic switches, each switch for controlling operation of one of said clamp assembly power means, said first up/down power means, said second fore/aft power means and said third kick bar power means.

9. A method for removing a pelt from an animal carcass suspended by both fore and hind legs in an upside down cradle position, said method comprising the steps of:
   a) gripping the left and right side worked up sock portions of the animal's fore legs with a clamp assembly of a pelt puller apparatus, said clamp assembly supported from a frame work having a first power means for positioning said clamp assembly in a vertical direction with respect to said animal carcass and a second power means for positioning said clamp assembly in a horizontal direction along an axis spaced from and parallel to a long axis of said animal carcass;
   b) simultaneously extending the suspended fore legs of the animal carcass in a forward direction while said second power means is operated in a reverse direction for pulling the pelt from a fore quarter region of the animal carcass, said fore legs being extended a sufficient distance to provide a desired tension and quick snap action for releasing the pelt from the shoulder region of the animal carcass without damage to the fell; and c) releasing said sock portions when said pelt is completely pulled from said animal carcass.

10. A method for pulling a pelt from an animal carcass as in claim 9 which includes the step of:
a) adjusting the vertical positioning of said clamp assembly via said first power means to maintain a desired pulling angle of said clamp assembly with respect to said animal carcass as said clamp assembly undergoes rearward horizontal movement from the animal carcass fore quarter to the animal carcass hind quarter.

* * * * *